United States Patent Office 3,125,574
Patented Mar. 17, 1964

3,125,574
1-AROYLPROPYL-4-ACYL-4-AMINO-
PIPERIDINES
Paul A. J. Janssen, Vosselaar, near Turnhout, Belgium, assignor to Research Laboratorium Dr. C. Janssen N.V., a corporation of Belgium
No Drawing. Filed Feb 21, 1962, Ser. No. 174,686
12 Claims. (Cl. 260—247.5)

The present invention relates to a novel group of 1-aroylpropyl-4-acylpiperidines. More particularly, it relates to compounds having the following general formula

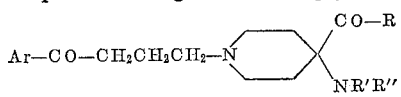

wherein Ar is a member of the class consisting of fluorophenyl and thienyl; R is a member of the class consisting of lower alkyl and phenyl; and —NR'R" is a member of the class consisting of dimethylamino, morpholino, piperidinyl, and pyrrolidinyl.

The lower alkyl radicals referred to above contain up to 6 carbon atoms and include both straight-and-branched-chain radicals. They are exemplified by alkyl radicals such as methyl, ethyl, propyl, isopropyl, butyl, and hexyl.

The compounds of this invention are useful because of their valuable pharmacological properties. In general terms, these compounds can be said to be neuroleptics. More specifically, they are anti-apomorphine agents, they are appetite inhibitors, and they show analgesia-like effects without mydriatic activity.

The organic bases of this invention form pharmaceutically acceptable salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide, and crotyl bromide.

The compounds of this invention are prepared by the condensation of an aroylpropyl halide of the formula Ar—CO—CH$_2$CH$_2$CH$_2$-Halogen with an appropriate 4-acylpiperidine of the formula

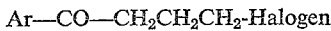

wherein Ar, R, and —NR'R" are defined as above. The reaction can be carried out in an inert solvent such as an aromatic hydrocarbon (e.g., benzene, toluene, xylene) or a lower alkanone (e.g., acetone, butanone, pentanone or 4-methyl-2-pentanone). In certain cases, the reaction can be usefully accelerated by the use of elevated temperatures. The intermediate 4-acylpiperidines referred to above can be prepared by the reaction of a 1-benzyl-4-cyanopiperidine of the formula

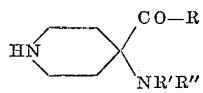

with the appropriate organolithium compound to give the corresponding 4-acylpiperidine followed by catalytic hydrogenation.

The compounds which constitute this invention and the methods for their preparation will appear more fully from a consideration of the following examples, which are given for the purpose of illustration only and are not to be construed as limiting the invention in spirit or in scope. In these examples, quantities are indicated in parts by weight, temperatures are expressed in degrees centigrade, and pressures are expressed in millimeters of mercury.

*Example 1*

A solution of ethyl lithium is prepared from 20.8 parts of lithium and 180 parts of ethyl bromide in 1520 parts of petroleum ether. To this solution is added a solution of 121.5 parts of 1-benzyl-4-cyano-4-dimethylaminopiperidine in 2000 parts of petroleum ether. This mixture is stirred and refluxed for 2 hours, and then cooled in an ice-salt bath and decomposed by the portionwise addition of 1000 parts of water. The organic layer is separated and dried and hydrogen chloride gas is introduced into it. The hydrochloride which forms is boiled for one hour in 2500 parts of water and 200 parts of concentrated hydrochloric acid. This solution is treated with activated charcoal and filtered. The filtrate is alkalized and extracted with ether. The ether layer is separated, and dried and hydrogen chloride gas introduced. The solvent is decanted and the remaining precipitate is triturated in a mixture of acetone and propanol to given 1-benzyl-4-propionyl - 4 - dimethylaminopiperidine dihydrochloride, melting at about 225–227.4° C.

If equivalent quantities of the appropriate 1-benzyl-4-cyano-4-(substituted amino)piperidine and the appropriate alkyl or aryl lithium are substituted for the 1-benzyl-4-cyano-4-dimethylaminopiperidine and ethyl lithium respectively, and the above procedure is repeated, the following compounds are obtained:

1-benzyl-4-propionyl-4-(1-pyrrolidino)piperidine dihydrochloride, melting at about 237.2–239° C. with decomposition.

1-benzyl-4-propionyl-4-(1-morpholino)piperidine dihydrochloride, melting at about 176.5–183° C. with decomposition.

1-benzyl-4-propionyl-4-(1-piperidino)piperidine hydrochloride, melting at about 207.6–210.4° C.

1-benzyl-4-acetyl-4-(1-piperidino)piperidine hydrochloride. The free base of this compound melts at about 57.2–60° C.

1-benzyl - 4 - butyryl-4-(1-piperidino)piperidine hydrochloride, melting at about 191.2–193° C.

1 - benzyl - 4-benzoyl-4-(1-piperidino)piperidine hydrochloride, melting at about 239–242° C.

*Example 2*

A mixture of 49 parts of 1-benzyl-4-acetyl-4-piperidinopiperidine, 240 parts of 2-propanol, 150 parts of distilled water and 28 parts of concentrated hydrochloric acid is hydrogenated under atmospheric pressure at room temperature in the presence of 16 parts of palladium-on-charcoal catalyst. After the calculated amount of hydrogen is taken up, hydrogenation is stopped and the catalyst is filtered off. The charcoal is boiled in 150 parts of water, and filtered, and the filtrates combined. After evaporation of the solvent from the filtrates, the oily residue is dissolved in 150 parts of water, and the solution is alkalized and extracted with ether. Evaporation of the ether solvent leaves oily 4-acetyl-4-piperidinopiperidine.

An equivalent quantity of the appropriate 1-benzyl-4-acylpiperidine is substituted for the 1-benzyl-4-acetyl-4-piperidinopiperidine and the above procedure is repeated. Hydrochloric acid is omitted from the reaction mixture if the starting amine is used as the dihydrochloride while one-half of the indicated amount of hydrochloric acid is

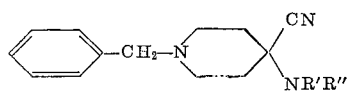

used if the starting amine is used as the monohydrochloride. In this way, the following compounds are obtained:
4-propionyl-4-piperidinopiperidine.
4-propionyl-4-dimethylaminopiperidine.
4-butyryl-4-piperidinopiperidine.
4-propionyl-4-(1-pyrrolidinyl)piperidine.
4-propionyl-4-morpholinopiperidine.
4-benzoyl-4-piperidinopiperidine melting at about 140–151° C.

*Example 3*

To a stirred mixture of 3.9 parts of 4-propionyl-4-dimethylaminopiperidine 6.4 parts of sodium carbonate and 0.1 part potassium iodide in 160 parts of 4-methyl-2-pentanone, there is added portionwise a solution of 5.3 parts of 2-(γ-chlorobutyryl) thiophene in 40 parts of 4-methyl-2-pentanone. Upon completion of the addition, the mixture is stirred and refluxed for 60 hours. After cooling the reaction mixture, 50 parts of water are added. The aqueous layer is separated and extracted again with ether. The combined organic layers are dried over potassium carbonate and filtered and hydrogen chloride gas is introduced into the filtrate to give an oily hydrochloride. The ether is decanted, the oil is crystallized from a mixture of 80 parts of acetone and 40 parts of 2-propanol and the solid is recrystallized from a mixture of 2-propanol and water to give 1-[γ-(2-thenoyl)propyl]-4-propionyl-4-dimethylaminopiperidine dihydrochloride, melting at about 221.5–232° C.

The free base of this compound has the following formula

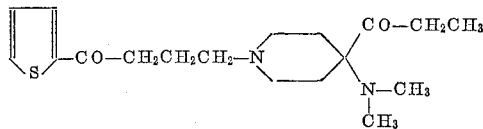

*Example 4*

An equivalent quantity of 4-propionyl-4-(1-pyrrolidinyl)-piperidine is substituted for the 4-propionyl-4-dimethylaminopiperidine and the procedure of Example 3 is repeated. This gives 1-[γ(2-thenoyl)propyl]-4-propionyl-4-(1-pyrrolidinyl)-piperidine dihydrochloride melting at about 210–211° C. The free base of this compound has the following formula

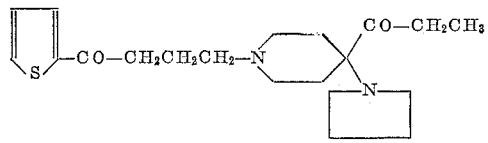

*Example 5*

A mixture of 5.3 parts of 2-(γ-chlorobutyryl)thiophene, 4.2 parts of 4-acetyl-4-piperidinopiperidine, 6.4 parts of sodium carbonate and 0.1 part of potassium iodine in 200 parts of 4-methyl-2-pentanone is stirred and refluxed for 60 hours. The cooled reaction mixture is divided between 50 parts of water and 400 parts of ether. The organic layer is separated and dried over potassium carbonate and hydrogen chloride gas is introduced into it. A sticky hydrochloride precipitates. The ether is decanted and the crude hydrochloride is dissolved in 300 parts of water. The aqueous solution is treated with charcoal and filtered before it is alkalized with sodium hydroxide solution and extracted with ether. The ether solution is dried over potassium carbonate and hydrogen chloride gas is introduced to give 1-[γ-(2-thenoyl)propyl]-4-acetyl-4-piperidinopiperidine dihydrochloride melting at about 248–253° C.

If an equivalent quantity of 4-propionyl-4-piperidinopiperidine is substituted for the 4-acetyl-4-piperidinopiperidine and the above procedure is repeated, the final product is 1-[γ-(2-thenoyl)propyl]-4-propionyl-4-piperidinopiperidine dihydrochloride melting at about 192.5–195.5° C.

If an equivalent quantity of 4-propionyl-4-morpholinopiperidine is substituted for the 4-acetyl-4-piperidinopiperidine and the above procedure is repeated, the product is 1-[γ-(2-thenoyl)propyl]-4-propionyl-4-morpholinopiperidine dihydrochloride hydrate melting at about 193.5–198.5° C.

*Example 6*

To a mixture of 5.6 parts of γ-chloro-4-fluorobutyrophenone, 6.4 parts of sodium carbonate and 0.1 part of potassium iodide in 160 parts of anhydrous toluene is added portionwise a solution of 4.5 parts of 4-propionyl-4-piperidinopiperidine and 40 parts of anhydrous toluene. When the addition is complete, the mixture is stirred and refluxed for 60 hours. The resultant mixture is cooled and 50 parts of water is added. The organic layer is separated and the aqueous layer is washed once with ether and the ether washing is combined with the original organic layer and dried. Evaporation of the solvents leaves a residue which is dissolved in 240 parts of ether. Introduction of hydrogen chloride gas into the ether solution precipitates a sticky hydrochloride which is filtered off and boiled in a mixture of acetone and 2-propanol to give 1-[γ-(4-fluorobenzoyl)propyl]-4-propionyl-4-piperidinopiperidine dihydrochloride melting at about 205–212° C. with decomposition.

If 5.6 parts of γ-chloro-3-fluorobutyrophenone is substituted for the 5.6 parts of γ-chloro-4-fluorobutyrophenone and the above procedure is repeated, the product is 1 - [γ - (3-fluorobenzoyl)propyl]-4-propionyl-4-piperidinopiperidine dihydrochloride. The free base of this compound has the following formula

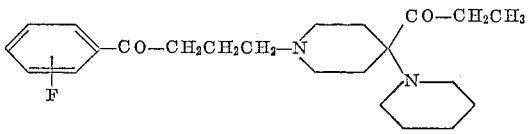

*Example 7*

To a mixture of 4.5 parts of 4-propionyl-4-morpholinopiperidine, 6.4 parts of sodium carbonate and 0.1 part of potassium iodide in 160 parts of 4-methyl-2-pentanone is added portionwise a solution of 5.6 parts of γ-chloro-4-fluorobutyrophenone in 40 parts of 4-methyl-2-pentanone. When the addition is complete, the reaction mixture is stirred and refluxed for 60 hours before it is cooled and 40 parts of water is added. The aqueous layer is separated and extracted once with ether. The combined organic layers are dried over potassium carbonate and hydrogen chloride is introduced into the filtrate to give a sticky layer which solidifies on standing. The solvent is evaporated and the residue is boiled in a mixture of 80 parts of 2-propanol and 40 parts of acetone. The resultant mixture is cooled to room temperature to give 1 - [γ - (4-fluorobenzoyl)propyl]-4-propionyl-4-morpholinopiperidine dihydrochloride melting at about 197.4–199.2° C. The free base of this compound has the following formula

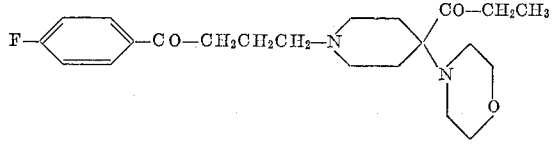

*Example 8*

A mixture of 5.6 parts of γ-chloro-4-fluorobutyrophenone, 4.3 parts of 4-propionyl-4-(1-pyrrolidinyl)piperidine, 6.4 parts of sodium carbonate and 0.1 part of potassium iodide in 200 parts of 4-methyl-2-pentanone is stirred and refluxed for 60 hours. The reaction mixture is cooled and filtered and the filtrate is diluted with 400 parts of ether. The resultant organic layer is dried and hydrogen chloride gas is introduced to the solution. A sticky hydrochloride precipitates. The ether is decanted from the solid and the solvent is evaporated to leave a residue which is combined with the hydrochloride which had precipitated. The combined solids are boiled in water and treated with charcoal and filtered. The filtrate is cooled, alkalized and extracted with ether. The organic layer is dried over potassium carbonate and the solvent is evaporated to leave a residue which is triturated first in acetone and then in diisopropyl ether to give 1-[γ-(4 - fluorobenzoyl)propyl] - 4 - propionyl - 4 - (1 - pyrrolidinyl)piperidine melting at about 88–91° C.

4.2 parts of 4-acetyl-4-piperidinopiperidine is substituted for the 4.3 parts of 4-propionyl-4-(1-pyrrolidinyl) piperidine and the above procedure is repeated. In this case hydrogen chloride gas is introduced into the last ether solution of the crude base to give the corresponding dihydrochloride. This compound is 1-[γ-(4-fluorobenzoyl)propyl]-4-acetyl-4-piperidinopiperidine dihydrochloride and it melts at 250–251.5° C.

The procedure of the second paragraph is repeated but 3.9 parts of 4-propionyl-4-dimethylaminopiperidine is substituted for the 4.3 parts of 4-propionyl-4-(1-pyrrolidinyl)piperidine. Hydrogen chloride gas is passed through the last ether solution of the amine to give 1-[γ - (4-fluorobenzoyl)propyl]-4-propionyl-4-dimethylaminopiperidine dihydrochloride melting at about 224.2–225° C.

*Example 9*

A stirred mixture of 5.6 parts of γ-chloro-4-fluorobutyrophenone, 4.8 parts of 4-butyryl-4-piperidinopiperidine, 6.4 parts of sodium carbonate and 0.1 part of potassium iodide in 200 parts of 4-methyl-2-pentanone is refluxed for 60 hours. The reaction mixture is cooled and 50 parts of water is added. The organic layer is separated and diluted to a volume of 1000 parts with ether. The solution is dried and hydrogen chloride gas is introduced to precipitate the hydrochloride. The solvent is decanted and the precipitated hydrochloride is boiled in a mixture of 80 parts of acetone and 4 parts of 2-propanol and triturated in 40 parts of boiling acetone and filtered to give 1-[γ-(4-fluorobenzoyl)propyl]-4-butyryl-4-piperidinopiperidine dihydrochloride melting at about 193–198.5° C.

*Example 10*

A mixture of 4.4 parts of γ-chloro-4-fluorobutyrophenone, 10 parts of 4-benzoyl-4-piperidinopiperidine and 0.1 part of potassium iodide in 120 parts of anhydrous toluene is heated in a sealed tube at 110° C. for 96 hours. The reaction mixture is cooled and the precipitate is filtered off. The filtrate is diluted with 600 parts of ether and the resultant solution is washed twice with 75 parts of water before it is dried over potassium carbonate. Hydrogen chloride is then introduced into the solution. An oil forms and this solidifies on standing. The ether is decanted and the hydrochloride is dissolved in 80 parts of water and treated with activated charcoal. The resultant mixture is filtered and the filtrate is alkalized and extracted with ether. The ether layer is dried over potassium carbonate and the solvent is evaporated to leave a residue which is triturated in diisopropyl ether. This is 1 - [γ-(4-fluorobenzoyl)propyl]-4-benzoyl-4-piperidinopiperidine melting at about 106.5–108° C. It has the following formula

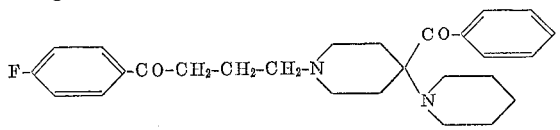

What is claimed is:
1. A compound of the formula

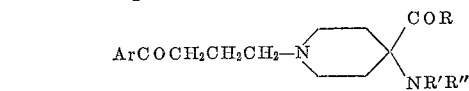

wherein Ar is a member of the class consisting of fluorophenyl and thienyl; R is a member of the class consisting of lower alkyl and phenyl; and —NR'R" is a member of the class consisting of dimethylamino, morpholino, piperidino and 1-pyrrolidinyl.

2. A compound of the formula

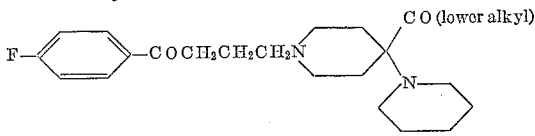

3. 1 - [γ-(4-fluorobenzoyl)propyl]-4-acetyl-4-piperidinopiperidine.
4. 1 - [γ - (4-fluorobenzoyl)propyl]-4-propionyl-4-piperidinopiperidine.
5. 1 - [γ-(4-fluorobenzoyl)propyl]-4-butyryl-4-piperidinopiperidine.
6. 1 - [γ - (4-fluorobenzoyl)propyl]-4-propionyl-4-dimethylaminopiperidine.
7. 1 - [γ - (4-fluorobenzoyl)propyl]-4-propionyl-4-(1-pyrrolidinyl)-piperidine.
8. 1 - [γ-(4-fluorobenzoyl)propyl]-4-propionyl-4-morpholinopiperidine.
9. A compound of the formula

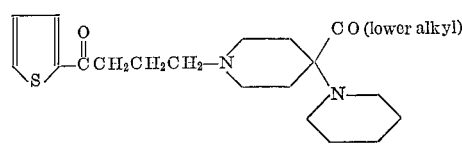

10. 1 - [γ-(2-thenoyl)propyl]-4-acetyl-4-piperidinopiperidine.
11. 1 - [γ-(2-thenoyl)propyl)]-4-propionyl-4-piperidinopiperidine.
12. 1 - [γ-(2-thenoyl)propyl]-4-propionyl-4-(1-pyrrolidinyl)piperidine.

References Cited in the file of this patent
UNITED STATES PATENTS
3,041,344    Janssen _____ June 26, 1962
OTHER REFERENCES
Braenden et al.: Bulletin of the World Health Organization, volume 13, pages 958–962 (1955).